United States Patent

Textoris

[15] 3,642,244
[45] Feb. 15, 1972

[54] HEIGHT ADJUSTMENT MECHANISM FOR SWIVEL CHAIRS

[72] Inventor: Melvin A. Textoris, Struthers, Ohio
[73] Assignee: The General Fireproofing Company, Youngstown, Ohio
[22] Filed: Jan. 28, 1970
[21] Appl. No.: 6,352

[52] U.S. Cl. .................................248/406, 287/58 CT
[51] Int. Cl. ..................................................F16m 11/00
[58] Field of Search ..........................248/188.4, 405, 406; 287/58 CT, 61

[56] References Cited

UNITED STATES PATENTS

| 437,188 | 9/1890 | Franklin | 248/406 |
| 593,059 | 11/1897 | Sheriffs et al. | 248/406 |
| 1,817,559 | 8/1931 | Harter | 248/406 X |
| 1,973,948 | 9/1934 | Fogelstrom | 248/188.4 |

FOREIGN PATENTS OR APPLICATIONS

| 1,045,510 | 10/1966 | Great Britain | 248/405 |

Primary Examiner—William H. Schultz
Attorney—Emory L. Groff and Emory L. Groff, Jr.

[57] ABSTRACT

A support portion includes a sleeve having slots formed therethrough for gaining access to the interior of the sleeve. A threaded screw portion has the upper end thereof interconnected with a seat support and is rotatably supported within the sleeve. A nut is threaded on the screw portion and includes a laterally extending projection adapted to engage a member extending through the hole in the sleeve to prevent rotation of the nut upon rotation of the screw portion. A further screw is supported by the support portion for preventing disassembly of the mechanism.

6 Claims, 4 Drawing Figures

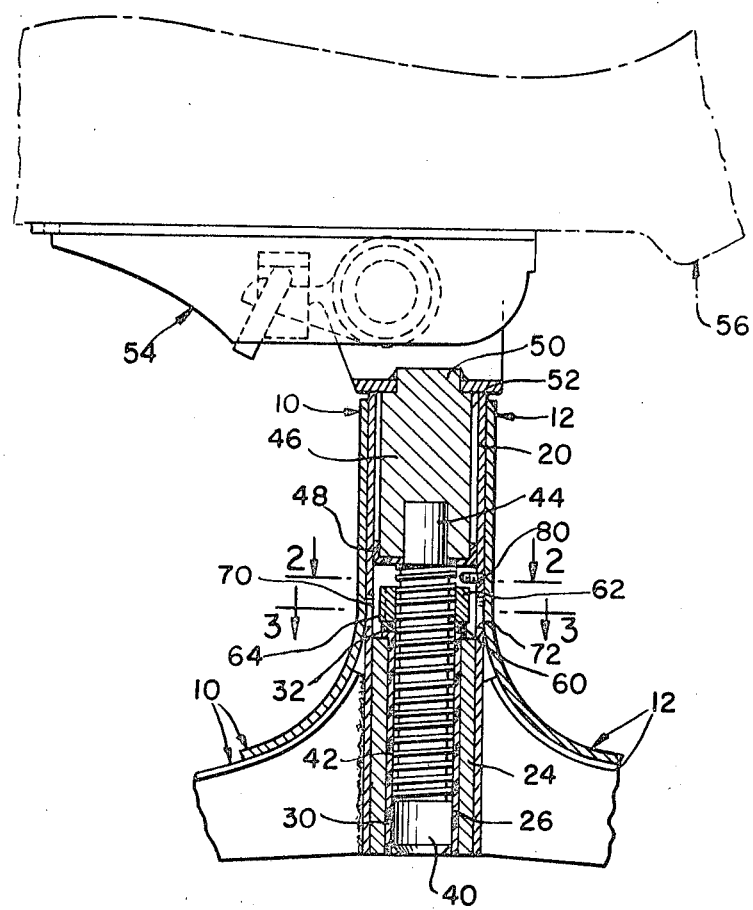
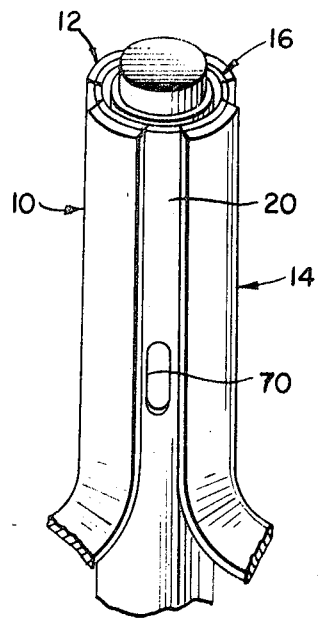
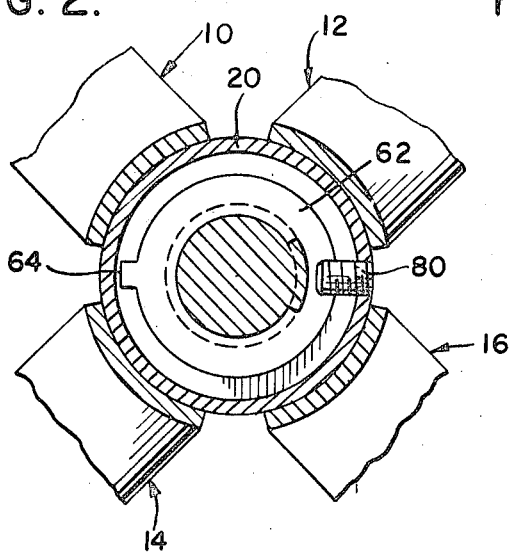
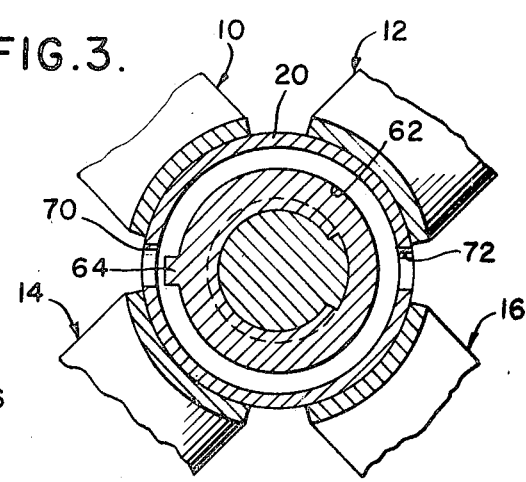
INVENTOR
MELVIN A. TEXTORIS

HEIGHT ADJUSTMENT MECHANISM FOR SWIVEL CHAIRS

BACKGROUND OF THE INVENTION

The present invention relates to mechanism for adjusting the height of the seat support in an associated seat of a swivel chair.

In swivel chairs, it is, of course, necessary to provide a support mechanism which normally allows free swiveling movement of the seat while at the same time it permits raising and lowering of the seat to adjust the height thereof to accommodate persons of different size.

Various constructions have been provided in the prior art for permitting height adjustment of swivel chairs, and such mechanisms are often of excessively complex and bulky construction, and furthermore, suffer from the disadvantage that they are difficult to adjust.

It is accordingly an objective of the present invention to provide a height adjustment mechanism for swivel chairs which is quite simple and inexpensive in construction and additionally which enables height adjustment to be made in a most simple and effective manner with a minimum of effort and without requiring the swivel chair to be turned upside down to gain access to the adjustment mechanism as is often required with prior art constructions.

SUMMARY OF THE INVENTION

A support portion includes a sleeve having a pair of diametrically opposite slots formed therein for gaining access to the sleeve. A stop means in the form of a screw is also threaded within the sleeve and extends inwardly thereof so as to prevent disassembly of the mechanism until such disassembly is desired.

A screw portion is rotatably supported within the sleeve and the upper end thereof is interconnected with a seat support upon which the seat of the swivel chair is mounted. A screw portion has threads formed on the outer surface thereof, and nut means is threaded on the screw portion.

The nut means includes a laterally extending projection which is adapted to engage a member extending through one of the slots formed in the sleeve whereby the nut means can be held against rotation while the seat and seat support are rotated thereby causing rotation of the interconnected screw portion. As the screw portion rotates with respect to the nut means which is held against rotation, the screw portion will move axially so as to raise or lower the seat depending upon the direction of relative rotation between the screw portion and the nut means.

The seat support and associated seat are ordinarily mounted for free swiveling movement, and when it is desired to make a height adjustment, any suitable member such as a coin, the end of a standard Allen wrench or any other suitable type of wrench or tool may be inserted through one of the slots formed in the sleeve of the support portion for engaging the projection on the nut means to hold the nut against rotation. When the nut is being so held, the seat and seat support can be rotated in the appropriate direction so as to cause the desired height adjustment. This operation can be carried out without turning the chair upside down and access can readily be gained to the nut means for producing such adjustment.

BRIEF DESCRIPTION OF THE DRAWINGS

FIG. 1 is a vertical section through the height adjustment mechanism of a swivel chair according to the present invention with portions thereof being broken away;

FIG. 2 is a sectional view on an enlarged scale taken substantially along line 2—2 of FIG. 1 looking in the direction of the arrows;

FIG. 3 is a sectional view taken substantially along line 3—3 of FIG. 1 looking in the direction of the arrows; and, FIG. 4 is a top perspective view illustrating the height adjustment mechanism with the seat and seat support removed therefrom.

DESCRIPTION OF THE PREFERRED EMBODIMENT

Referring now to the drawings wherein like reference characters designate corresponding parts throughout the several views, four substantially equally spaced leg portions 10, 12, 14 and 16 are provided, these leg portions being of any suitable relatively conventional construction and having the usual caster mechanisms mounted at the outer ends thereof. The inner ends of the leg portions are rigidly secured as by welding to a support sleeve 20 of generally cylindrical cross-sectional configuration. Sleeve 20 may be formed of a suitable strong material such as steel tubing.

A tubular hub 24 having a central bore 26 formed therethrough is fitted within sleeve 20 and is welded thereto. Hub 24 may be formed for example of cold rolled steel. An antifriction liner 30 of tubular construction is disposed within the bore 26 formed through the hub and has a peripherally extending radially outwardly directed flange 32 at the upper end thereof which rests on the upper edge of hub 24. Liner 30 may be formed of any suitable antifriction material such as Delrin or the like.

A screw portion 40 comprises an elongated generally cylindrical member having threads 42 formed on the outer surface thereof and received within the central bore defined through liner 30. The upper end 44 of the screw portion is of reduced dimension and is press fitted within an extension means or post 46 which may also be formed of cold rolled steel. A generally cup-shaped bearing 48 formed of a suitable antifriction material such as nylon is disposed about the lower end of extension means 46 and is disposed between the extension means and the surrounding sleeve.

The upper end 50 of the extension means is of reduced dimension and fits through a hole provided in a plate 52 and is rigidly secured thereto as by welding. Plate 52 forms the lower part of a conventional seat support 54 which supports an associated seat indicated by phantom line 56 of the swivel chair.

An annular washer 60 is disposed in surrounding relationship to the screw portion and is seated on the flange 32 at the upper end of the liner. A nut 62 has a threaded bore formed therethrough which receives the threaded screw portion, this nut being seated on washer 60. Nut 62 includes a laterally extending projection 64 which is adapted to be engaged by a suitable member for holding the nut against rotation.

In order to gain access to the nut and the projection formed thereon, a pair of diametrically oppositely disposed elongated slots 70 and 72 are provided. These slots are adapted to receive any suitable member such as a coin, a wrench or any other suitable tool for engaging the projection on the nut to hold the nut against rotation. These slots are, of course, disposed in portions of the sleeve intermediate the associated leg portions, and as seen most clearly in FIG. 3, slot 70 is disposed between leg portions 10 and 14, and slot 72 is disposed between leg portions 12 and 16.

Sleeve 20 is also provided with a further threaded hole disposed directly above slot 72, a screw 80 being threaded into this hole and extending inwardly so as to be disposed in overlying relationship to a portion of nut 62. This screw prevents the mechanism from being inadvertently disassembled if one should lift the seat support and seat with respect to the leg portions. When it is desired to disassemble the mechanism, screw 80 may be removed whereupon the seat and seat support along with the screw portion and nut means may be lifted out of the support portion.

As this invention may be embodied in several forms without departing from the spirit or essential characteristics thereof, the present embodiment is therefore illustrative and not restrictive.

I claim:

1. Height adjustment mechanism for a swivel chair including a seat support disposed above a leg structure, comprising, a tubular sleeve fixedly attached to said leg structure and extending upwardly toward the bottom of said seat support, a longitudinally extending tubular hub fixedly mounted within the lower portion of said sleeve and having an antifriction liner substantially overlying its inner periphery, a post attached to the bottom of said seat support and extending downwardly therefrom into said tubular sleeve, radial bearing means carried by the lower portion of said post and slidably engaging said sleeve, a longitudinal screw element enveloped within said sleeve and having its lower portion slidably fitted within said antifriction liner and its upper end fixedly attached to the lower portion of said post within said sleeve, a nut engaging said screw element intermediate the bottom of said post and the top of said hub within said sleeve, thrust bearing means intermediate said nut and the top of said hub, and access means through said sleeve juxtaposed said nut to permit insertion of suitable means engageable with said nut to prevent rotation thereof whereby subsequent rotation of said seat support turns said post and screw element to vary the height thereof relative to said nut and the leg structure.

2. Mechanism as defined in claim 1, including a projection on said nut extending laterally outwardly therefrom for engagement by a member inserted through said access means.

3. Mechanism as defined in claim 1, including stop means projecting inwardly between said nut and said post for preventing unwanted disassembly of the mechanism.

4. Mechanism as defined in claim 3, wherein said stop means comprises a screw removably mounted through said sleeve.

5. Mechanism as defined in claim 1, wherein said thrust bearing means includes a flat washer.

6. Mechanism as defined in claim 1, wherein said thrust bearing means includes an extension of said liner radially projecting over the top portion of said hub.

* * * * *